Dec. 14, 1937.  J. FALLOU  2,102,145

AUTOMATIC REGULATOR

Filed Aug. 3, 1935    2 Sheets—Sheet 1

INVENTOR
JEAN FALLOU
BY Haseltine Lake & Co.
ATTORNEYS

Dec. 14, 1937.  J. FALLOU  2,102,145
AUTOMATIC REGULATOR
Filed Aug. 3, 1935  2 Sheets-Sheet 2
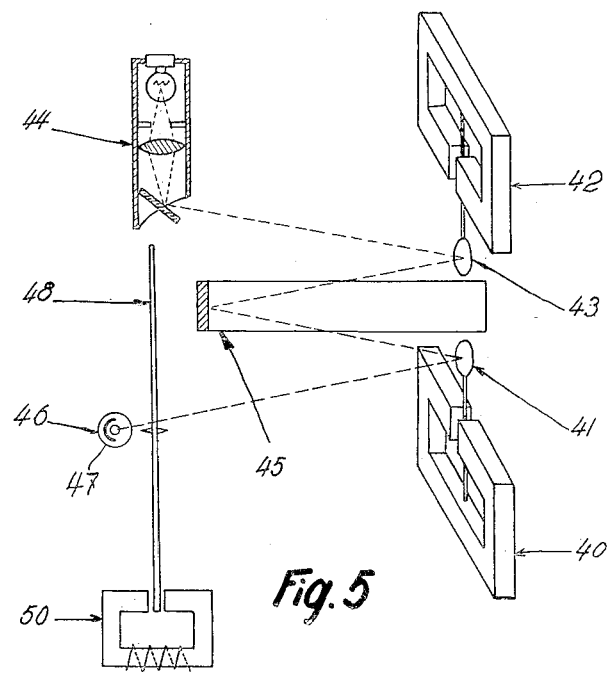
Fig. 5
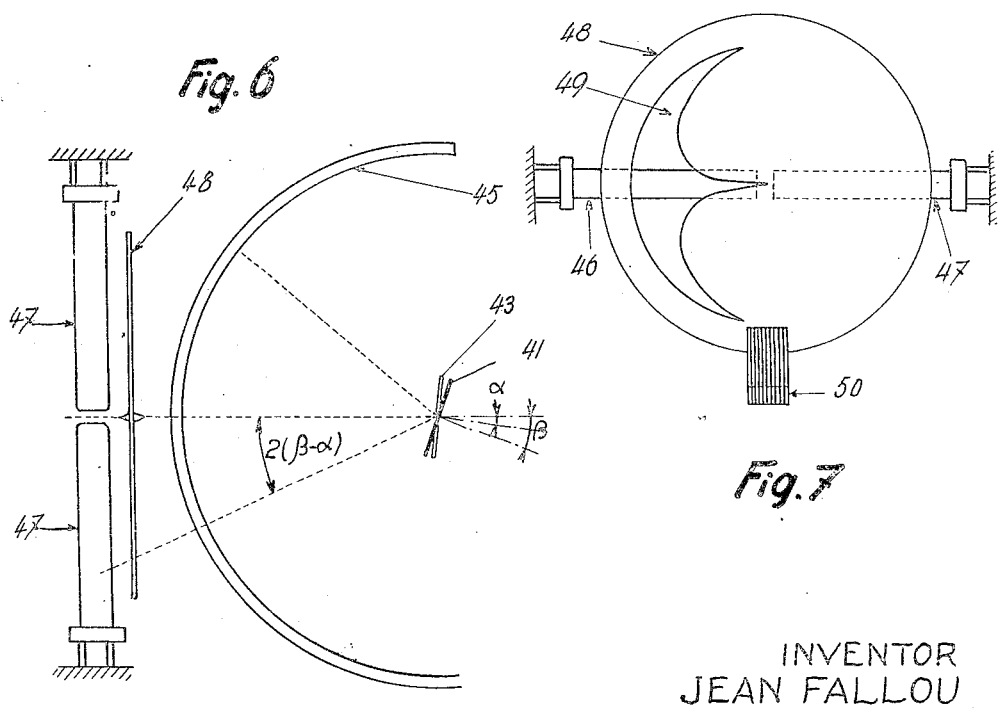
Fig. 6
Fig. 7
INVENTOR
JEAN FALLOU
BY Haseltine, Lake & Co.
ATTORNEYS Patented Dec. 14, 1937

2,102,145

UNITED STATES PATENT OFFICE 2,102,145

AUTOMATIC REGULATOR

Jean Fallou, Montrouge, France, assignor to Compagnie pour la Fabrication des Compteurs & Materiel d'Usines a Gaz, a corporation of France Application August 3, 1935, Serial No. 34,639
In France August 4, 1934

4 Claims. (Cl. 250—41.5)

This invention relates to a regulating system for remote regulation or control of certain types of apparatus.

It is often necessary to make use of apparatus capable of automatically regulating the operation of a machine located at a certain distance from the place at which the measurements are effected that are intended to control this regulation. For instance it may be desired to regulate the flow of a pump in accordance with the water level in the tank that is to be fed by said pump, or it is perhaps desired to regulate the power supplied by an electric generator in accordance with the power flowing through an interconnection line which is more or less remote.

The regulating device generally includes a measurement apparatus which, when it has undergone a predetermined deviation, closes the contacts of an auxiliary electric circuit acting on a relay or a servo-motor. On the other hand it is known that, in order that the conditions of working that are to be regulated may be stable, it is necessary that the action of the regulating device may be the more intensive as the difference between the measured conditions of working and the desired conditions of working is greater.

A great number of such apparatus exist already but they generally require that a relatively considerable amount of energy should be supplied to them, so that it is impossible to use them in some cases. This is due to the fact that, in some cases, the measurement apparatus giving the value of the factor to be regulated can supply but a very small torque and cannot supply the force, small as it may be, necessary for closing, for instance, the contacts of auxiliary electric circuits.

The object of the present invention is to provide a simple device making it possible to use a measurement apparatus to regulate the operation of a machine in a stable manner, that is to say to have a device adapted to work in such manner that its action is the more intensive as the variation in the working of the machine is more important, without requiring any effort from the measurement apparatus above mentioned.

The essential feature of the present invention consists in feeding current to the servo-motor or servo-motors that control the regulating devices of the machine through auxiliary electric circuits closed by means of one or several photoelectric cells.

According to an embodiment of the invention, means are provided for periodically exciting these cells through a light beam having a direction of which depends upon the position of the movable part of the measurement apparatus, the whole being so devised that the time during which the cells are energized, to which the period of time corresponds for which the servo-motors are caused to act, is the longer as the deviation of the measurement apparatus from its normal position is greater.

According to another embodiment of the invention, the servo-motor or servo-motors acting on the machine to be regulated, is, or are, fed with current through auxiliary electric circuits, controlled through photo-electric cells, which are energized by a light beam reflected from a succession of mirrors, some of which are stationary while the others are rigid with the movable parts of the measurement apparatus.

Other features of the present invention will appear from the following detailed description of some specific embodiments thereof.

Preferred embodiments of the present invention will be hereinafter described with reference to the accompanying drawings, given merely by way of example, and in which:

Fig. 5 is a diagrammatic perspective view of another embodiment for regulating the power of an electric generating set in accordance with the value of the power supplied by another electric generating set located at any distance whatever from the first one;

Figs. 6 and 7 are detail views corresponding to Fig. 5.

Figure 1:
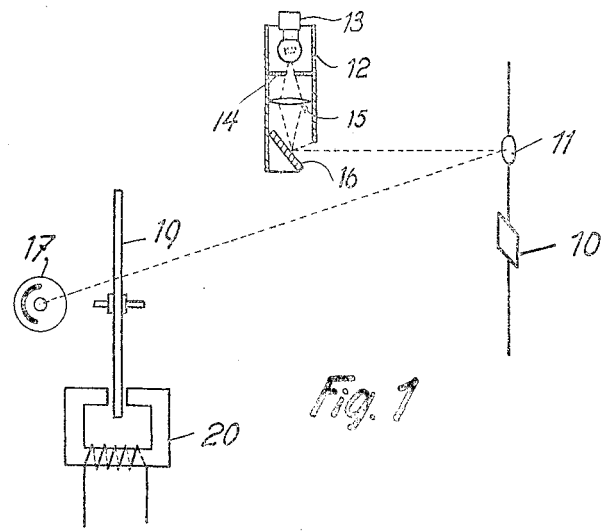
Figs. 1 and 2 are diagrammatic perspective views illustrating a first embodiment of the invention, as applied to the regulation of a factor that must be maintained at a uniform value, for instance the automatic regulation of the frequency or the power of an electric generating set.
Figure 2:
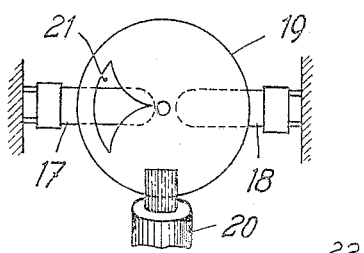

In the embodiment of Fig. 1, reference character 10 designates the movable element of a device used for measurement, for instance the coil of a galvanometer. On this movable element is fixed a mirror 11 upon which impinges a light beam from an optical system 12. This optical system includes an electric lamp 13, a diaphragm 14, a lens 15, and a stationary mirror 16. Mirror 11 reflects the light beam in the direction of two photo-electric cells 17 and 18, both of elongated shape, only one of which is shown in Fig. 1, but which are both visible in front view in Fig. 2. These two cells are arranged adjacent to each other and in line with each other in a plane at right angles to the axis of revolution of the movable part of the measurement apparatus. Across the path of the light rays there is disposed an opaque disc 19 driven, with a uniform rotary motion, by any suitable device, for instance a rotary field motor 20. This disc 19 is provided with an aperture 21. The axis of disc 19 is located between cells 17 and 18, in such manner that, in the course of its rotary motion, aperture 21 discloses now cell 17 now cell 18. On the other hand, the measurement apparatus is arranged in such manner that, when the value of the factor it measures is equal to the predetermined value it should always have, the light beam impinges on the center of the disc and strikes neither of the two cells. When the measurement apparatus deviates from this position, the light beam strikes one or the other of these cells 17 and 18, according to the direction of the deviation, aperture 21 will each time allow said light beam to pass. Finally, the edges of said aperture 21 are cut in such manner that the interval of time during which the light beam can strike one or the other of these cells is longer in proportion as the distance from said light beam to the center of the disc is greater. Cell 17 is inserted in the circuit of a servo-motor adapted to act, for instance, in such manner as to accelerate the machine to be regulated, while cell 18 is inserted in the circuit of another servo-motor adapted to act in such manner as to slow down the machine in question.

The operation of this device is quite clear: If the machine runs at the desired rate, the light beam strikes none of the cells and no current is fed to the servo-motors. If the machine is running at too high a rate, the light beam strikes cell 18 and thus closes the circuit of the servo-motor that is adapted to slow down the machine, for a period of time which is greater in proportion as the variation of the machine increases from its normal speed. On the contrary, if the speed of the machine decreases, the light beam strikes cell 17 and thus closes the circuit of the accelerating servo-motor for a period of time which is proportionately greater as the variation of the machine increases from its normal speed. Of course, it is possible, by giving a suitable shape to the edges of aperture 21, to render the duration of the regulating impulses exactly proportional to the variation of speed of the machine or to give this duration any desired value in accordance with the degree of said variation. On the other hand, the above described specific embodiment has been given merely by way of example and might be modified while remaining within the scope of the present invention.

Figure 3:
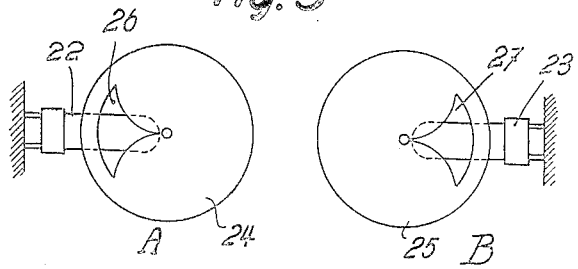
Figs. 3 and 4 are diagrammatic views illustrating another embodiment applied to the automatic regulation of a factor that must vary in accordance with the value of another variable factor, for instance the regulation of the power of an electric generating set in accordance with the value of the power supplied by another electric generating set.

Fig. 3 shows another device based on the same principle but which permits of regulating a factor in accordance with the variations of another factor. This device includes two measurement apparatuses A and B, not shown in the drawings, one of which measures the value of the factor to be regulated while the other one measures the other factor in accordance with which this regulation is to take place. The movable parts of these apparatuses are each provided with a mirror, respectively, and each of these mirrors reflects a light beam, from a stationary source, in the direction of a photo-electric cell. Apparatus A for instance is associated with cell 22 and apparatus B with cell 23. Across the paths of the light rays of said beams, there are disposed rotary discs 24 and 25, both provided with identical apertures 26 and 27, respectively. Discs 24 and 25 both turn at the same speed of revolution and uncover simultaneously cells 22 and 23, respectively. Apertures 26 and 27 are so shaped that the times during which the light beams energize the cells are proportional to the magnitude measured by the corresponding apparatus. If, for instance, the value of the factor measured by apparatus A is equal to $P_1$, the time for which the cell 22 shall be energized shall be equal to:

$$t_1 = kP_1$$

$k$ being a constant.

In a similar manner, if the value of the factor measured by apparatus B is $P_2$, the time during which cell 23 is to be energized shall be:

$$t_2 = kP_2$$

Figure 4:
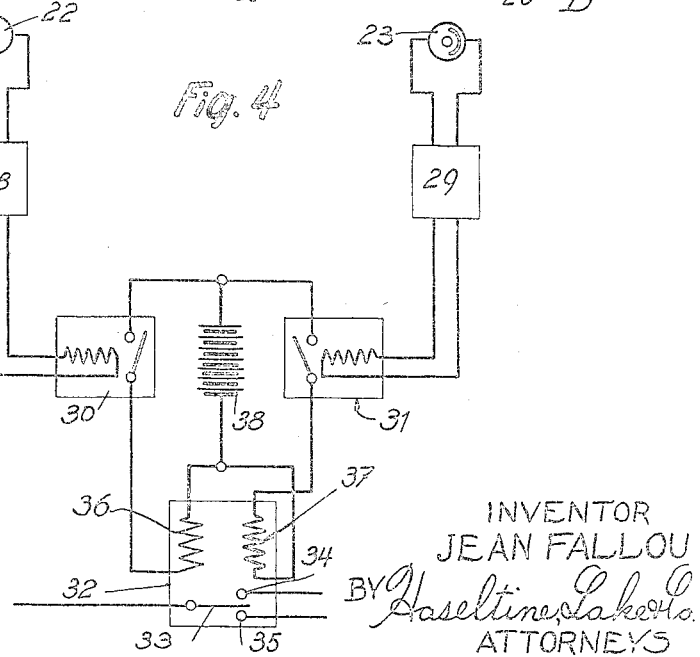

Now, as shown by Fig. 4, cells 22 and 23 are inserted in two circuits including amplifiers 28 and 29 and relays 30 and 31, respectively. A polarized relay 32, having a movable contact 33 and two stationary contacts 34 and 35, is energized by two identical windings 36 and 37. Winding 36 is fed with current from source 38 when relay 30 is closed, that is to say when cell 22 is illuminated. Winding 37 is fed with current from the same source 38, but in the opposite direction, when relay 31 is closed, that is to say when cell 23 is illuminated. As these two windings are fed with current in opposite directions, respectively, movable contact 33 remains in the position of rest when these two windings are simultaneously fed with current and therefore as long as cells 22 and 23 are simultaneously illuminated. On the contrary contact 33 will be shifted against stationary contact 34 when winding 36 and consequently cell 22 are alone energized. Finally contact 33 will be moved against stationary contact 35 when winding 37 and therefore cell 33 are alone illuminated. It will be readily understood that, under these conditions, the time during which the contacts of relay 32 are closed is equal to:

$$t_3 = t_1 - t_2 = k(P_1 - P_2)$$

and is therefore proportional to the difference between the magnitude that is used for comparison and the magnitude to be regulated. On the other hand, movable member 33 will be moved against contact 34 when $P_1$ is greater than $P_2$ and member 33 will be moved against contact 34 when $P_1$ is smaller than $P_2$. When contacts 33 and 34 are brought against each other this operates a servo-motor in such manner as to tend to reduce the value of factor $P_1$ for the machine that is to be regulated, while, when contacts 33 and 35 are brought against each other, this brings into operation a servo-motor (which may be the same) in such manner as to tend to increase the value of factor $P_1$ for the machine that is to be regulated.

Of course, apertures 26 and 27 may be given shapes such that the duration of energizing of the cells, instead of being proportional to the magnitudes that are measured, may be any predetermined function of these magnitudes.

In the embodiment of Fig. 5, 40 designates an apparatus measuring the magnitude in accordance with the variations of which the regulation is to take place, that is to say the power $P_b$ supplied by a generating set. The movable part of this apparatus carries a mirror 41. Reference number 42 designates an apparatus for measuring the magnitude to be regulated, that is to say the power Pa supplied by another generating set. The movable part of this apparatus 42 also carries a mirror 43. Mirror 43 is struck by a light beam from an optical system 44 and reflects this light beam onto a cylindrical mirror 45, fixed in stationary position with its center on the axis of revolution of mirrors 41 and 43. With this arrangement, the light beam reflected from mirror 45 impinges on mirror 41, whatever be the angular position of mirror 43. Said light beam is now reflected by mirror 41 in the direction of two photoelectric cells 46 and 47, of elongated shape, only one of which is visible in Fig. 5 but both of which are shown in plan view in Fig. 6. These two cells are located adjacent to, and in line with, each other in a plane at right angles to the axis of revolution of mirrors 41 and 43. Cell 46 is inserted in the circuit of a servo-motor acting, for instance, in such manner as to increase the power of the generating set that is to be regulated, while cell 47 is inserted in the circuit of a servo-motor acting in such manner as to reduce the power of the generating set that is to be regulated.

If $\alpha$ is the angle of rotation of mirror 43 with respect to the direction of the incident light beam and $\beta$ the angle of rotation of mirror 41 with respect to the same direction, it can readily be understood from the view of Fig. 6 that the total angular deviation of the light beam is equal to $2(\beta-\alpha)$. Therefore it is easy to place the optical system 44 in a position such that the light beam passes through the space between cells 46 and 47, and therefore energizes neither of these cells, when $\beta-\alpha$ is equal to zero. Now, calling Pa the power of generating set A and Pb that of generating set B, if the measurement instruments 40 and 42 are adjusted in such manner that $$\alpha = kPa \text{ and } \beta = f(Pb)$$

$f$ representing a predetermined function and $k$ being a constant, the light beam illuminates no cell as long as the condition $$kPa = f(Pb)$$

is complied with.

On the contrary, the light beam energizes one of the cells 46 and 47 as soon as this condition ceases to be complied with, that is to say as soon as $(\beta-\alpha)$ is no longer equal to zero.

In order that the regulation may be stable, I interpose, across the path of travel of the light rays, between mirror 41 and cells 46 and 47, an opaque disc 48 provided with an aperture 49. This disc is shown in front view in Fig. 7. Its center is positioned in the space between cells 46 and 47 and it is driven with a rotary motion by a motor 50, in such manner that aperture 48 uncovers first cell 46 and then cell 47. By cutting the edges of this aperture in such manner that the time during which the light beam strikes one or the other of the cells is proportionately longer as the variation $(\beta-\alpha)$ is increased, successive impulses whereof the durations increase with this variation are caused to be applied to the relays, this arrangement preventing overshooting the mark and unstable working, as is generally the case with the usual regulating devices.

The measurement apparatus 40 and 42 may be watt-meters, tele-wattmeters, or any other measurement apparatus. If, for instance, apparatus 1 is a frequency-meter and apparatus 3 is a wattmeter, the device embodying the present invention constitutes a frequency regulating device giving a static curve of regulation, that is to say such a curve that the frequency to be regulated decreases when the power supplied by the generating set to be regulated increases. In a similar manner, by blocking in a predetermined position, which may be accomplished from a distance, the movable portion of one of the measurement apparatus, the regulating device is caused to ensure a uniform value of the factor to be regulated.

Although, in the preceding description, I have referred only to the combination of two forms of measurement apparatus, it is clear that the invention applies to the combination of any number of measurement apparatus. I may also, according to my invention, cause the light source itself to move along a circle having its center on the geometrical axis of revolution of the movable mirrors, this movement being effected either manually or automatically as a function of one of the factors and according to any predetermined law.

In a general manner, while I have, in the above description, disclosed what I deem to be practical and efficient embodiments of the present invention it should be well understood that I do not wish to be limited thereto as there might be changes made in the arrangement, disposition and form of the parts without departing from the principle of the present invention as comprehended within the scope of the appended claims.

What I claim is:

1. In a regulating system for an electric circuit, the combination of two distinct instruments for measuring different factors of said circuit, respectively, associated with said circuit, a photoelectric cell in said circuit adapted to control said circuit, and optical means, including a source of light, and an optical element associated with each of these measurement instruments, for controlling the action of a light beam on said photo-electric cell as a function of the respective values of both of the factors measured by said instruments.

2. In a regulating system for an electric circuit, the combination of two distinct instruments adapted to measure different factors of said circuit, respectively, a photo-electric cell in said circuit adapted to control said circuit, a source of light, two optical deflectors associated with said instruments respectively and movable in accordance with the respective values of the factors measured by said instruments, one of said deflectors being arranged to receive a light beam for said source, means for directing the light beam from said last mentioned deflector onto the other deflector, and means for causing the light beam from said second mentioned optical deflector periodically to impinge upon said photoelectric cell for periods of time depending upon the respective positions of both of said optical deflectors.

3. In a regulating system for an electric circuit, the combination of two distinct instruments adapted to measure different respective factors of said circuit, a photo-electric cell in said circuit adapted to control said circuit, a source of light, two mirrors associated with said measurement instruments, respectively, and movable in accordance with the respective values of the factors measured by said instruments respectively, one of said mirrors being arranged to receive a light beam directly from said source, a stationary mirror for reflecting the light beam reflected from said last mentioned movable mirror onto the other mirror, and means for causing the light beam reflected from said second mentioned movable mirror periodically to impinge upon said photo-electric cell for periods of time depending upon the respective positions of both of said movable mirrors.

4. In a regulating system for an electric circuit, the combination of two instruments adapted independently to measure different respective factors of said circuit, two photo-electric cells adapted to control said circuit, said cells being arranged to act in opposite directions, a source of light, two mirrors associated with said measurement instruments, respectively, and movable in accordance with the respective values of the factors measured by said instruments, respectively, one of said mirrors being arranged to receive a light beam directly from said source, a stationary mirror for reflecting the light beam reflected from said last mentioned movable mirror onto the other movable mirror, the whole being arranged in such manner that for predetermined relative values of the factors measured by said instruments respectively, the light beam reflected from said second mentioned movable mirror is directed between said two photo-electric cells, and means for causing the light beam reflected from said second mentioned movable mirror periodically to impinge upon either of said photo-electric cells for variable periods of time according to the direction and the amplitude of the relative deviations of said mirrors from the positions corresponding to said predetermined relative values.

JEAN FALLOU.